US012649186B2

(12) United States Patent
Chandelle et al.

(10) Patent No.: US 12,649,186 B2
(45) Date of Patent: Jun. 9, 2026

(54) METHOD FOR DETECTING DEFECTS DURING LASER ADDITIVE MANUFACTURING, DATA PROCESSING DEVICE, COMPUTER PROGRAM AND STORAGE MEDIUM FOR IMPLEMENTING THE METHOD

(71) Applicant: ARIANEGROUP SAS, Les Mureaux (FR)

(72) Inventors: André Chandelle, Vernon Cedex (FR); Guillaume Redoules, Vernon Cedex (FR)

(73) Assignee: ARIANEGROUP SAS, Les Mureaux (FR)

( * ) Notice: Subject to any disclaimer, the term of this patent is extended or adjusted under 35 U.S.C. 154(b) by 323 days.

(21) Appl. No.: 18/250,003

(22) PCT Filed: Oct. 22, 2021

(86) PCT No.: PCT/FR2021/051864
§ 371 (c)(1),
(2) Date: Apr. 21, 2023

(87) PCT Pub. No.: WO2022/084640
PCT Pub. Date: Apr. 28, 2022

(65) Prior Publication Data
US 2023/0390824 A1     Dec. 7, 2023

(30) Foreign Application Priority Data
Oct. 22, 2020     (FR) ........................................ 2010828

(51) Int. Cl.
B22F 10/80          (2021.01)
B22F 10/28          (2021.01)
(Continued)

(52) U.S. Cl.
CPC .............. B22F 10/80 (2021.01); B22F 10/28 (2021.01); B33Y 50/00 (2014.12); G06T 7/0004 (2013.01);
(Continued)

(58) Field of Classification Search
CPC .......... B22F 10/80; B22F 10/28; B33Y 50/00; B33Y 10/00; B33Y 30/00; G06T 7/0004;
(Continued)

(56) References Cited

U.S. PATENT DOCUMENTS

2019/0114510 A1*     4/2019     Bremer ................ G06V 10/764
2019/0248078 A1      8/2019     Domröse et al.

FOREIGN PATENT DOCUMENTS

JP          2018100954 A      6/2018
WO          2018204981 A1    11/2018
(Continued)

OTHER PUBLICATIONS

French Search Report issued in French Application No. 2010828 on Jun. 25, 2021 (1 page).
(Continued)

*Primary Examiner* — Stephen G Sherman
(74) *Attorney, Agent, or Firm* — Bookoff McAndrews, PLLC

(57) ABSTRACT

A method for detecting defects during laser additive manufacturing, comprising the following steps: B21) a first image is captured, the first image being the image, captured in the infrared spectrum, of an upper surface of a layer of powder exposed to laser scan; B23) the first image is processed using a first convolutional neural network of self-encoding type, in such a way as to produce a defect mask indicating the location of defects at the upper surface of the layer of powder. A method for manufacturing parts during which the presence of defects is detected using the preceding method. A data-processing device, computer program and storage medium for the implementation of this method.

20 Claims, 6 Drawing Sheets

(51) Int. Cl.

| | |
|---|---|
| *B33Y 50/00* | (2015.01) |
| *G06T 7/00* | (2017.01) |
| *B33Y 10/00* | (2015.01) |
| *B33Y 30/00* | (2015.01) |

(52) U.S. Cl.

CPC ............... *B33Y 10/00* (2014.12); *B33Y 30/00* (2014.12); *G06T 2207/10048* (2013.01); *G06T 2207/20084* (2013.01); *G06T 2207/30164* (2013.01)

(58) Field of Classification Search

CPC ........... G06T 2207/10048; G06T 2207/20084; G06T 2207/30164

See application file for complete search history.

(56) References Cited

FOREIGN PATENT DOCUMENTS

| | | | |
|---|---|---|---|
| WO | 2019106179 A2 | 6/2019 | |
| WO | 2019159419 A | 8/2019 | |
| WO | 2020146490 A1 | 7/2020 | |
| WO | WO-2020185169 A1 * | 9/2020 | .............. B22F 10/20 |

OTHER PUBLICATIONS

International Search Report and Written Opinion issued in International Application No. PCT/FR2021/051864, on Jan. 21, 2022 (16 pages).

Ronneberger Olaf et al. "U-Net: Convolutional Networks for Biomedical Image Segmentation" In: U-Net: Convolutional Networks for Biomedical Image Segmentation, pp. 234-241, May 18, 2015.

Tan Yingshui et al. "An Encoder-Decoder Based Approach for Anomaly Detection with Application in Additive Manufacturing" 2019 18th IEEE International Conference On Machine Learning and Applications (ICMLA), IEEE, Dec. 16, 2019, pp. 1008-1015. DOI: 10.1109/1 CMLA.2019.00171 XP033719742.

Tonnaer Loek et al. "Anomaly Detection for Visual Quality Control of 3D-Printed Products" 2019 International Joint Conference On Neural Networks (JJCNN), IEEE, Jul. 14, 2019, pp. 1-8. DOI: 10.I 109/IJCNN.2019.8852372 XP033622212.

Xinbo Qi et al. "Applying Neural-Network-Based Machine Learning to Additive Manufacturing: Current Applications, Challenges, and Future Perspectives" Engineering, vol. 5, No. 4, Jul. 3, 2019 (Jul. 3, 2019), pp. 721-729, DOI: HTTPS://DOI.ORG/10.1016/J.ENG.2019.04.012, XP002796699.

Notice of Reasons for Rejection issued in Japanese Application No. 2023-524781, mailed Oct. 14, 2025 (5 pages).

* cited by examiner

[Fig. 1]
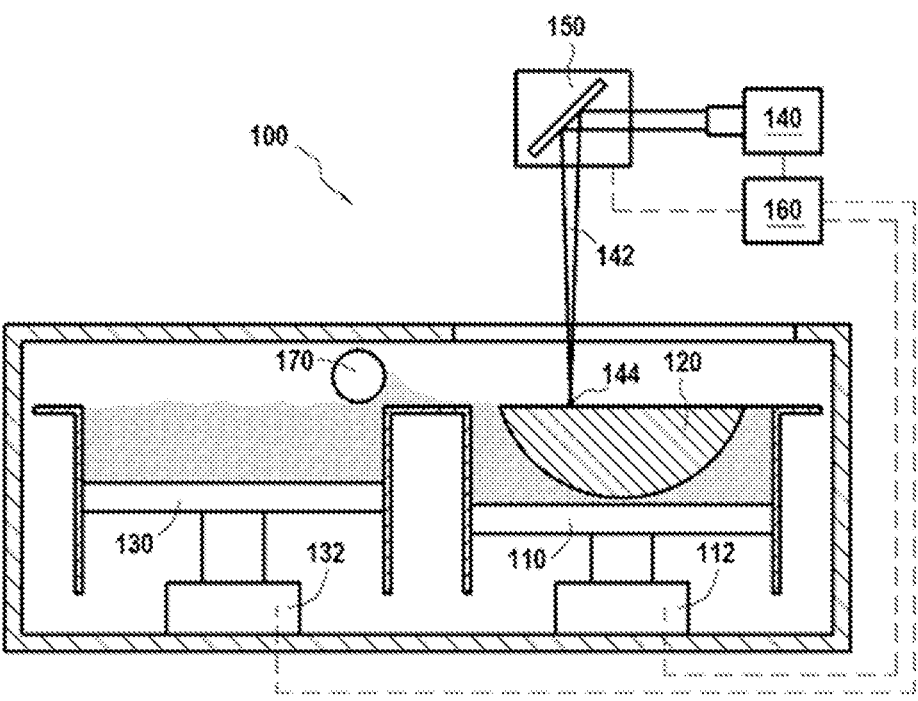
[Fig. 2]
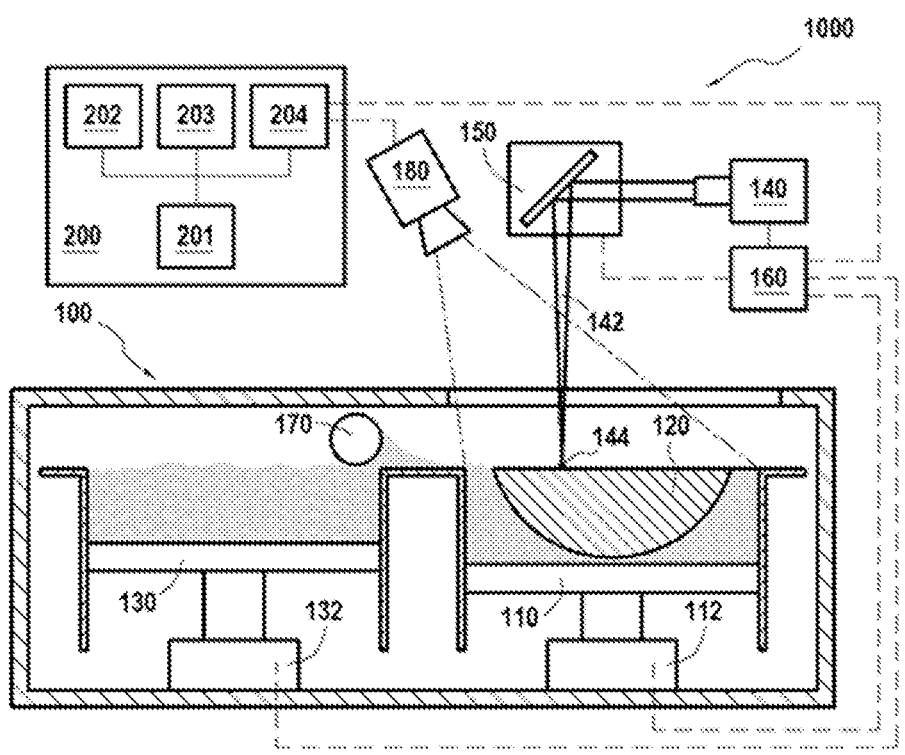

[Fig. 3]
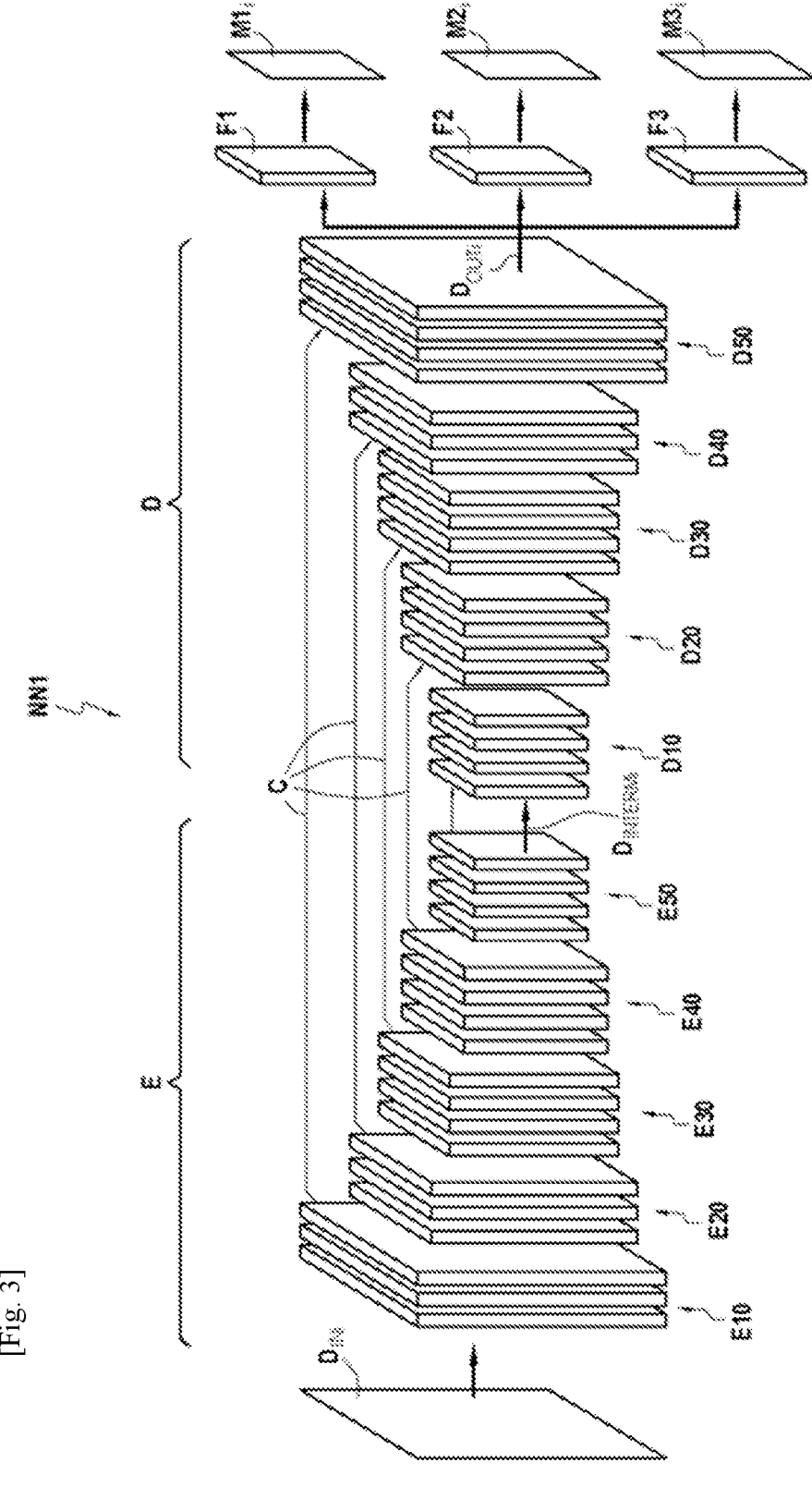

[Fig. 4]
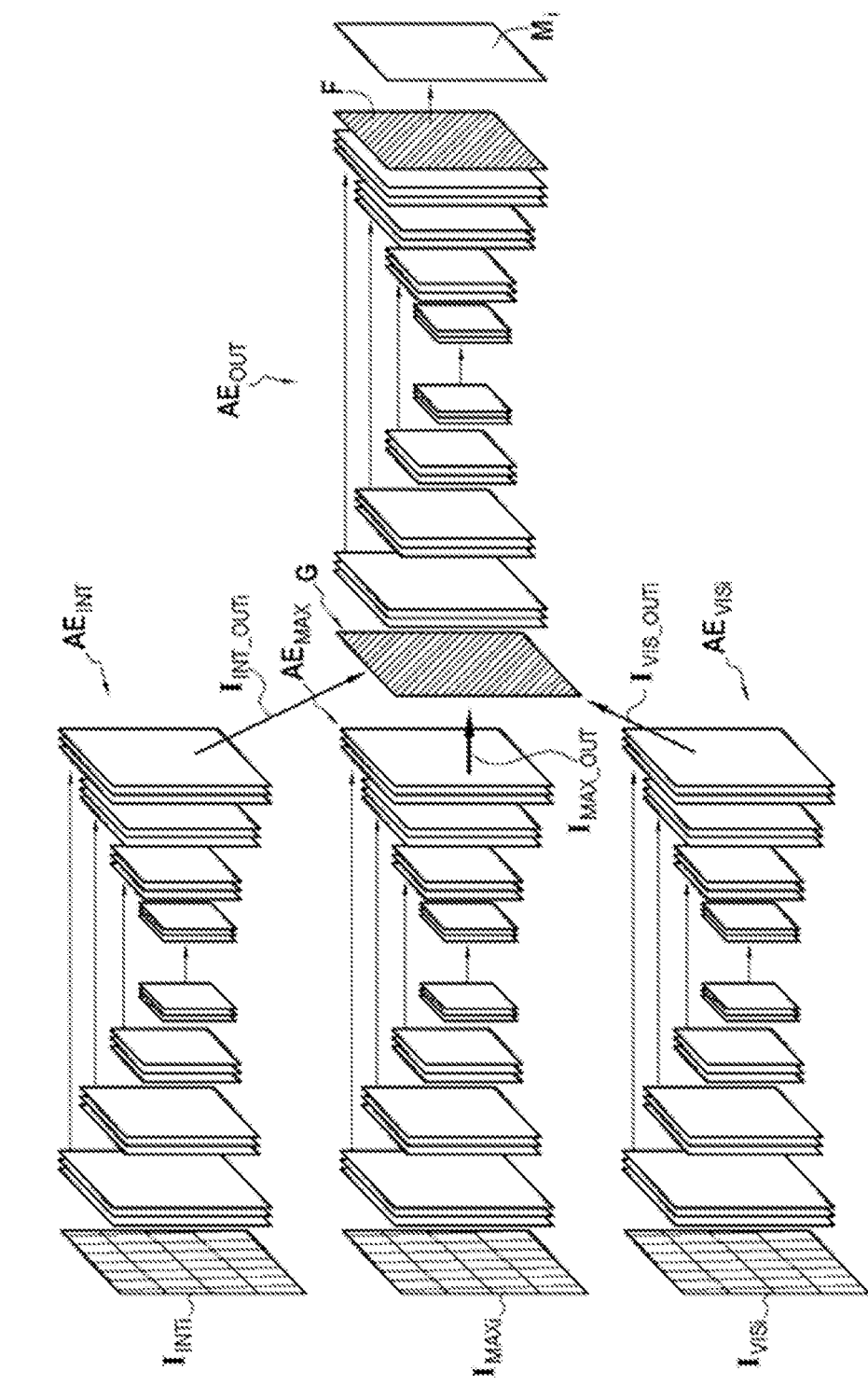

[Fig. 5]
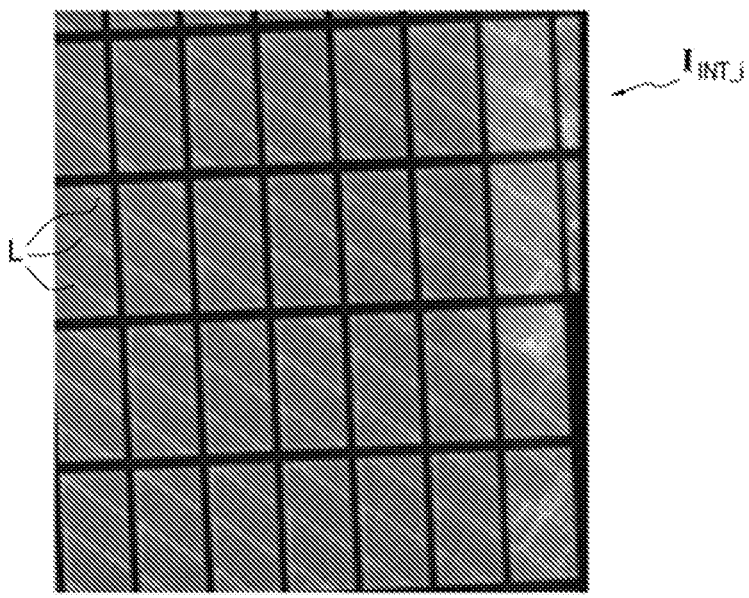
[Fig. 6]
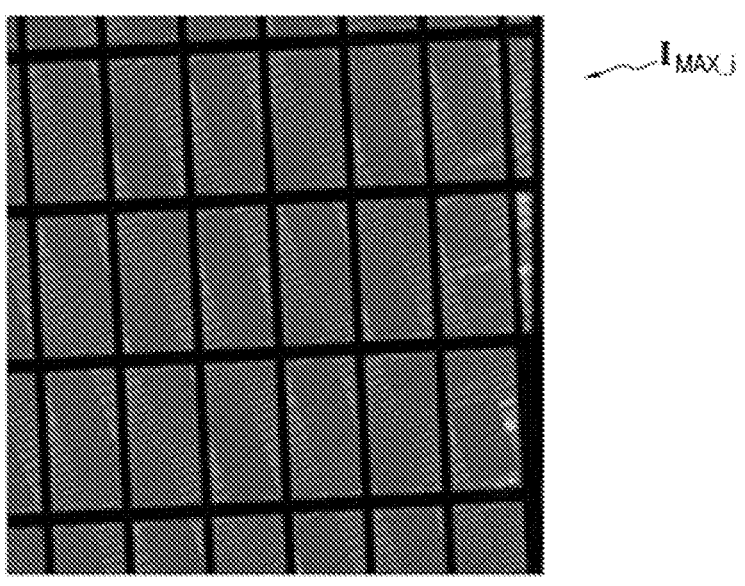

[Fig. 7]
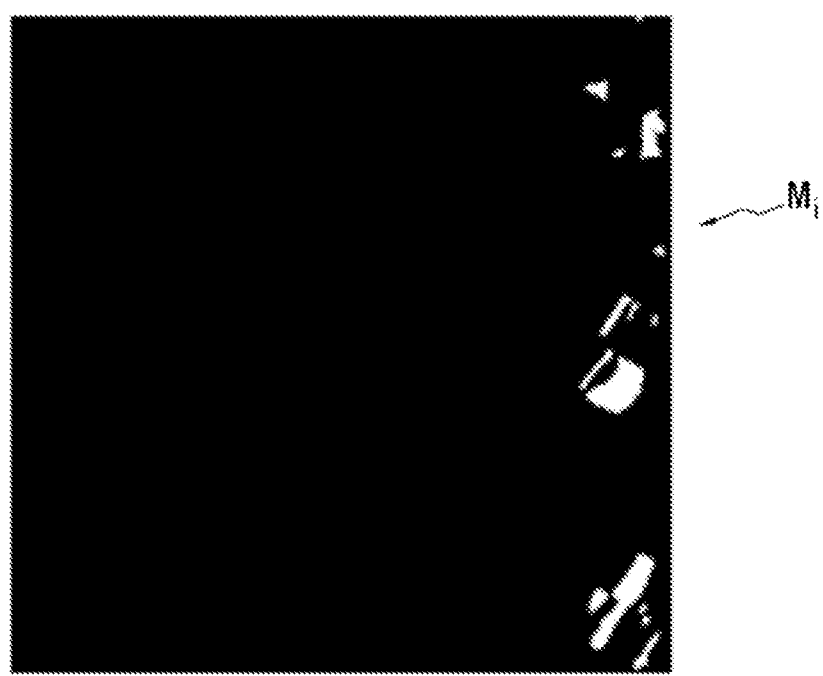

[Fig. 8]
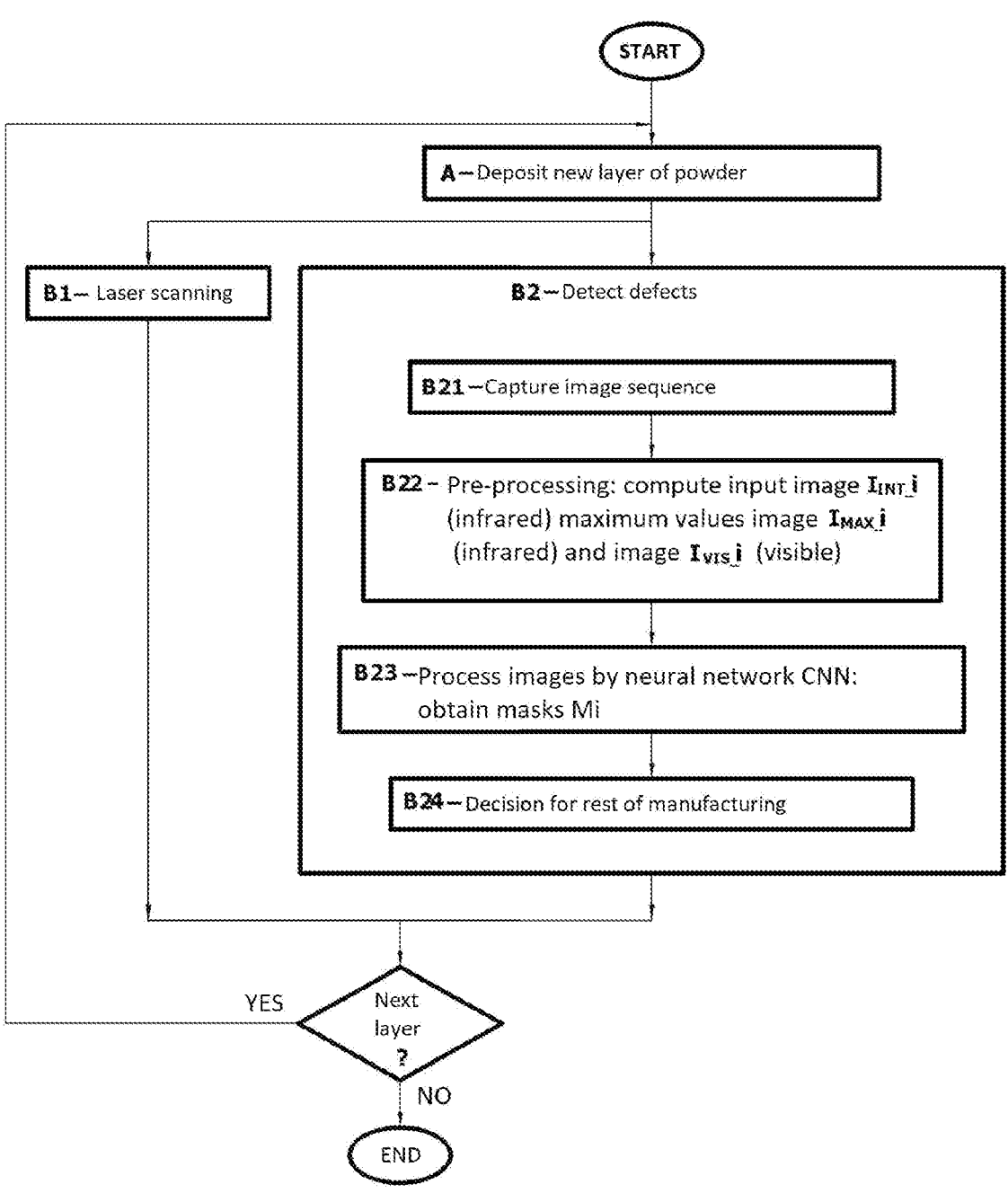

METHOD FOR DETECTING DEFECTS DURING LASER ADDITIVE MANUFACTURING, DATA PROCESSING DEVICE, COMPUTER PROGRAM AND STORAGE MEDIUM FOR IMPLEMENTING THE METHOD

CROSS-REFERENCE TO RELATED APPLICATION(S)

This is a National Stage Application under 35 U.S.C. § 371 of International Application No. PCT/FR2021/051864, filed Oct. 22, 2021, now published as WO 2022/084640 A1, which claims priority to French Patent Application No. 20 10828, filed on Oct. 22, 2020, the entireties of which are incorporated herein by reference.

TECHNICAL FIELD

The invention relates to the field of manufacturing quality control methods, in the special case of laser additive manufacturing.

PRIOR ART

FIG. 1 schematically represents a method for powder bed selective fusion.

This method is implemented using a powder bed (in this case, metallic powder) selective fusion manufacturing machine 100. The machine 100 includes a manufacturing plate 110, on which the part to be manufactured 120 will be manufactured layer by layer, a powder reserve plate 130 and a laser source 140. The plates 110 and 130 include actuators 112 and 132 which can be controlled in such a way as to control the height position of each of the platforms.

The machine 100 further includes a controllable mirror 150, and a control unit 160, configured to drive the orientation of the mirror and the height of the platforms 110 and 130.

The fabrication of a part consists in successively manufacturing the part, layer by layer.

The alloy that will make the part is initially in powder form. In each manufacturing cycle, the following operations are carried out:

A scraper 170 deposits a layer of powder;

the laser beam 142 emitted by the laser source 140 is directed by the mirror 150 in such a way as to selectively scan the layer of powder deposited, in such a way as to melt the particles of powder in the areas that must be part of the part (these areas being defined based on the 3D digital definition of the part to be manufactured).

At the point of impact 144 of the laser beam on the powder layer, the temperature can reach 2 000° C., making the upper powder layer melt, but also one or more of the lower layers, thus locally creating a liquid bath. The solidification of the successive layers gradually forms the part.

As the manufacture progresses, the tray of reserve powder 130 rises to allow the scraper 170 to deposit new layers of powder; conversely, the manufacturing plate 110 descends by an increment equivalent to the thickness of a melted layer.

During such a fabrication, manufacturing defects may occur, for many reasons: laser beam focusing defect, too much fusion at the point of impact of the laser beam, presence of impurities in the powder etc.

It is therefore necessary, to ensure the quality of the manufactured part, to detect these defects as soon as possible in such a way as to instigate the appropriate corrective actions.

Conventionally, the detection of defects is done by taking photos of the surface of the powder layer subjected to the scanning by the laser beam; the photos are then interpreted by an operator specializing in the manufacturing in progress, in charge of detecting whether or not the manufacturing is normal, or if on the other hand a defect has occurred.

This control method is naturally expensive and liable to error. There is therefore a need for a method for detecting defects during manufacturing by selective laser fusion, which is more reliable and less expensive.

SUMMARY OF THE INVENTION

According to a first aspect of this disclosure, provision is made for a method for detecting defects during laser additive manufacturing making it possible to meet this need. This method is implemented by computer.

This method comprises the following steps:

B21) a first image is captured, said first image being the image, captured in the infrared spectrum, of an upper surface of a layer of powder exposed to laser scan;

B23) said first image is processed using a first convolutional neural network of self-encoding type, in such a way as to produce a defect mask indicating the location of the upper surface of said powder layer.

In certain modes of implementation, the step B23 of processing the first image is done by a relatively simple neural network, for example by the first neural network of self-encoding type as defined above. However, in certain implementation modes, the step B23 of processing the first image is done by a set of neural networks comprising, in addition to said first neural network defined above, one or more additional neural networks, particularly of self-encoding type.

The processing step B23 can be done during the manufacturing of the part (or parts), or subsequently.

A defect mask denotes in this document a single image or a set of images (a tensor); the image or each of the images of the mask represents the locations of one or more types of defect revealed at the upper surface of the powder coat. This defect or defects can be represented, for example, in the image or in each of the images of the mask, by a specific color, a plurality of specific colors, or by a specific range of colors.

Each image of the defect mask can for example be an image in grayscale (indicating for each pixel a probability of presence or the significance of the defect at the location of the pixel) or where applicable a binary image.

The defect types liable to be represented by the defect mask are for example a fusion lack, a burned area or else a contamination of the part due to the presence of an impurity in the powder layer.

In certain embodiments, several types of defect are represented in a single image: for example, a color or a range of colors can, in an image of the defect mask, correspond to a certain type of defect.

In certain embodiments, different images of the mask respectively represent the locations of different types of defect.

In certain embodiments, during the processing applied to said first image using said first convolutional neural network and producing the defect mask, the first image is transmitted only to an input of the first convolutional neural network.

It has become apparent that a convolutional neural network of self-encoding type, based on at least one image captured in the infrared spectrum of a surface exposed to a laser scan, this image being transmitted only to this input of the neural network, is able to process said at least one image in such a way as to make it possible to very effectively detect the defects occurring during laser additive manufacturing.

In other terms, such a neural network is able to effectively process the information contained in said first image, and consequently, it is pointless to subsequently refer to the first image again to obtain the defect mask.

In certain modes of implementation, the only items of information used to produce the defect mask are the items of information supplied as input to the first neural network, these items of information being supplied only as input of the first neural network. In these modes of implementation, it is therefore impossible for supplementary items of information, in addition to those supplied as input to the first neural network, to be taken into account to compute the defect mask. The processing therefore only takes it account the information supplied as input to the first neural network, particularly including said first image.

The surface exposed to laser scan is here naturally the surface of the powder layer deposited by the scraper, and which is subject to the scanning of the laser beam such that the powder is melted in certain predefined regions in such a way as to be incorporated into the part of the part already manufactured.

The expression 'laser scan' denotes an operation of scanning or traveling over all or part of a surface using a laser beam, the impact point of which moves over said surface.

The efficiency of the detection of defects by the neural network can be increased by implementing all or part of the following improvements:

In a mode of implementation, said first image is an integrated image of the upper surface. The term "integrated image" here denotes an image wherein for each pixel, the intensity of the pixel represents the cumulative luminous energy received by the pixel during a capturing period, particularly a capturing period of a duration greater than 0.1 second. The luminous intensity is thus integrated over time, and the value obtained is assigned to the pixel under consideration, thus forming the integrated image.

Different architectures may be envisioned for the neural network or networks involved in the processing step.

In a mode of implementation, in the processing step B23, the defect mask is directly produced by a convolutional neural network.

The expression directly produced by a neural network (in this case, convolutional) means that the defect mask is the (or an) output datum of the convolutional neural network. It is therefore impossible in this case for the defect mask to be obtained by applying to the output datum of this neural network a processing involving additional data or information (such as involving other images etc.) other than those supplied as input to this neural network.

It is also impossible in this case for the defect mask to be obtained by applying to the output data of the neural network a processing once again involving, at this stage, the data supplied as input to the neural network.

Nonetheless, the direct production of the output mask by the neural network does not preclude one or more operations of equalization, formatting, or thresholding, being performed by the neural network to produce its output datum comprising the defect mask.

In certain modes of implementation, the defect mask is directly produced by the first neural network. In other words, the first neural network is configured to directly produce the defect mask as output.

In certain modes of implementation, one or more additional images other than the first image indicated previously can be used to obtain the defect mask.

For example, in a mode of implementation, during the capturing step B21, a second image of the upper surface exposed to laser radiation is also captured; the second image is an image of said surface, captured in the infra-red spectrum, wherein for each pixel, the intensity of the pixel represents the maximum luminous energy received by the pixel during a capturing period; and during the processing step B23, the processing carried out takes the second image into account as input, in addition to the first image.

In a mode of implementation, during the capturing step B21, a third image of the upper surface exposed to the laser scan is also captured; the third image is an image of said surface, captured in the visible spectrum; and during the processing step B23, the processing performed takes the third image into account as input, in addition to the first image.

In one or the other of the two preceding modes of implementation, the first convolutional neural network can be configured to receive as input the first image and at least one first additional image from among said second image and said third image.

In this case, preferably the defect mask is directly produced by the first convolutional neural network.

However, a more complex architecture can also be used.

Thus in a first set of variants of one of the two preceding modes of implementation, during the processing step B23, the processing carried out is done using a set of neural networks comprising as input, said first convolutional neural network, and as output, an output neural network, particularly of self-encoding type, configured to receive as input the output of the first convolutional neural network and to produce the defect mask based on this input (preferably directly).

Advantageously in this first set of variants, the first convolutional neural network suffices to process several (at least two) types of image supplied as input.

Conversely, in a second set of variants of one of the two preceding modes of implementation, during the processing step B23, the treatment carried out using a set of neural networks comprising:

as input, said first convolutional neural network, and at least a first additional neural network of self-encoding type configured to receive as input a first additional image from among said second image or said third image; and as output, an output neural network, particularly of self-encoding type configured to receive as input the outputs of the first neural network and of said at least one first additional neural network, and to produce as output said defect mask.

In certain of the variants of the second set of variants defined above, the set of neural networks further comprises a second additional neural network of self-encoding type configured to receive as input a second additional image from among said second image and said third image, and which is other than the first additional image.

In a mode of implementation, at least one of the sets of neural networks of self-encoding type and for example, particularly said first neural network, comprises connections linking neural layers of index y to neural layers of index n-y, the total depth of said at least one of the neural networks under consideration being equal to n.

In a mode of implementation, the capturing step B21 is carried out using a photographic camera or a video camera, during the manufacturing of parts by powder bed laser fusion.

By extension, the disclosure also relates to a method for manufacturing parts by powder bed laser fusion, wherein at least one part is manufactured by powder bed laser fusion, and during or after the manufacturing of said at least one part, defects are detected by employing the method described previously. The powder used in this method can be powder of any composition, particularly metallic powders.

In a particular embodiment, the different steps of the method for detecting defects during laser additive manufacturing are determined by computer program instructions.

Consequently, this disclosure also relates to a computer program comprising instructions which, when the program is executed by at least one processor, lead said at least one processor to execute the steps of the method described previously. This program can use any programming language, and be in the form of source code, object code, or intermediate code between source code and object code, such as in a partially compiled form, or in any other desirable form.

This disclosure also relates to a non-volatile storage medium readable by computer, on which is stored the computer program set out previously. The information medium can be any entity or device capable of storing the program. For example, the medium may include a storage means, such as a ROM, for example a CD-ROM or a microelectronic circuit ROM, or else a magnetic recording means, for example a diskette (floppy disk) or a hard disk. Alternatively, the information medium can be an integrated circuit into which the program is incorporated, the circuit being suitable for executing or for being used in the execution of the method in question.

By extension, this disclosure also relates to a data-processing device comprising at least one processor as well as a memory in which instructions are recorded which, when they are executed by said at least one processor, lead said at least one processor to execute the steps of one of the methods described previously.

The data-processing device (or a part of it) can be integrated into a system for manufacturing parts by metallic powder bed laser fusion.

Consequently, this disclosure also includes a system for manufacturing parts by powder bed laser fusion, comprising a machine for manufacturing parts by powder bed laser fusion and a data-processing device as described previously.

BRIEF DESCRIPTION OF THE DRAWINGS

FIG. 1 (already presented) is a schematic representation of a conventional machine for manufacturing parts by powder bed laser fusion;

FIG. 2 shows a system for manufacturing parts by powder bed laser fusion according to this disclosure;

FIG. 3 shows a first neural network used for detecting defects in a method for detecting defects according to this disclosure;

FIG. 4 shows a set of neural networks used for detecting defects in a method for detecting defects according to this disclosure;

FIG. 5 is a representation of an integrated image computed during the implementation of a method according to this disclosure;

FIG. 6 is a representation of a maximal image computed during the implementation of a method according to this disclosure;

FIG. 7 is a schematic representation of a defect mask obtained by implementing a method according to this disclosure; and FIG. 8 is a flow chart schematically representing the steps of a method for manufacturing parts by selective powder bed fusion according to this disclosure.

DESCRIPTION OF EMBODIMENTS

By way of example, methods and systems for manufacturing by selective powder bed fusion in accordance with this disclosure will now be described in relation to FIGS. 2 to 8.

These manufacturing methods may be implemented using a system 1000 for manufacturing parts by laser as represented in FIG. 2, comprising a machine 100 for manufacturing parts by powder bed laser fusion and a data-processing device 200.

The machine 100 is nearly identical to the manufacturing machine 100 described in relation to FIG. 1; for this reason, elements which are identical or substantially identical in the two machines bear the same references in FIGS. 1 and 2. The peculiarity of the machine 100 of the system 1000, by comparison with the machine 100 of FIG. 1, is that it also includes a capturing device 180.

The capturing device 180 includes two video cameras, able to capture images in the infrared spectrum and in the visible spectrum respectively. The images captured by these cameras are transmitted to the data-processing device 200.

The data-processing device 200 possesses the hardware architecture of a computer, as schematically illustrated in FIG. 2. In general, any data-processing device comprising at least one memory able to record data and the program that will be described further on, and one or more processors able to execute this program, may be used. The data-processing device can be close to the machine 100, or contrariwise remote, and for example accessible via a network such as the Internet network.

In this embodiment, the data-processing 200 particularly comprises a processor 201, a read-only memory 202, a non-volatile flash memory 203, and also means of communication 204 with other components of the system 1000, including in particular the control unit 160.

The non-volatile memory 203 of the data-processing unit 200 constitutes a recording medium in accordance with this disclosure, readable by the processor 201 and on which is recorded a computer program in accordance with this disclosure, including instructions for executing the steps of a method for manufacturing parts by powder bed laser fusion (in particular comprising the steps of its defect detection sub-program) in accordance with this disclosure.

This program may take different forms. In a first mode of implementation (FIG. 3), it constitutes a first neural network NN1 within the meaning of this disclosure. In a second, more complex mode of implementation (FIG. 4), it constitutes a set NN2 of convolutional neural networks.

The network NN1 constituting a first convolutional neural network according to this disclosure is represented schematically on FIG. 3.

In this embodiment, the neural network NN1 is used to detect three types of defect based on the input images.

The network NN1 is a self-encoder which successively includes an encoder E, a decoder D and three layers of normalization F1, F2 and F3.

In this embodiment, the network NN1 is a self-encoder of U-net type. A network of U-net type is a network of self-encoding type which specifically includes connections C which directly connect the blocks of the encoder E to the blocks of the decoder D. Generally, a block at a position i is connected to a block at a position n−i, n being the total number of blocks.

The architecture of a network of U-net type is explained in particular in the publication by Olaf Ronneberger, Philipp Fischer and Thomas Brox: "U-net: Convolutional networks for biomedical image segmentation." (International Conference on Medical image computing and computer-assisted intervention. Springer, Cham, 2015).

The encoder E includes several successive convolutional blocks E10, E20, E30, E40 and E50 (generally, 3 to 5 convolutional blocks). Each of these convolutional blocks includes several successive layers of artificial neural networks. In each of these blocks, the upstream layers (usually two or three in number) are convolutional layers, and the last downstream layer is an under-sampling (or 'pooling' layer), which reduces the resolution of the processed data.

A convolutional layer here denotes a layer performing a convolution operation, followed by a batch normalization process then by a step of ReLU (Rectified Linear Unit) correction.

In a similar way to the encoder E, the decoder D also includes several successive convolutional blocks D10, D20, D30, D40 and D50. Each of these convolutional blocks includes several successive artificial neural layers. In each of these blocks, the downstream layers (usually two or three in number) are convolutional layers, and the last downstream layer is an over-sampling (or 'up-sampling' layer), which increases the resolution of the processed data.

Naturally, for the first neural network of other architectures than those of the network NN1 can be used while remaining within the scope of this disclosure.

As input, the encoder E receives at each iteration of index i an input datum $D_{IN\ i}$. This datum is processed by the encoder E which produces as output an intermediate datum $D_{INTERM\ i}$; this datum $D_{INTERM\ i}$ is transmitted as input to the decoder D. The latter processes this data and supplies an output datum $D_{Out\ i}$ to each of the normalization layers F1, F2 and F3.

Each of these normalizations layers applies a function Softmax, or normalized exponential function, to the datum $D_{OUT\ i}$ received from the decoder D and produces as output a final image (respectively M1i, M2i, M3i). The images M1i, M2i and M3i together form the defect mask Mi. In these images, each pixel has a value which represents an estimation (or prediction) for the pixel under consideration (i.e. at the location corresponding to this pixel at the surface of the layer under consideration), of the probability of a defect being presence, for the defect associated with the normalization layer under consideration.

In this embodiment, the defect mask Mi is therefore directly produced by the first neural network NN1.

Optionally, a thresholding (also known as binarization) function can then be applied to all or part of the mask Mi obtained at the output of the normalization layers, to facilitate the processing or interpretation of the masks obtained. The thresholding function consists, for each pixel, in comparing the value of the pixel to a predetermined threshold and thus assigning a binary value 0 or 1 to the pixel, according to whether the pixel has a value less than or greater than the threshold respectively.

The input datum $D_{IN\ i}$ can simply be an integrated image $I_{INT}$ of the layer of powder that was exposed to the laser scan.

However, the datum $D_{IN\ i}$ can also be a tensor obtained by concatenating two images or more: in particular, the integrated image $I_{INT}$, and where applicable a maximum image $I_{MAX}$ and/or a visible image $I_{VIS}$.

The taking into account, as input, of two images or more makes it possible to improve the performance of the neural network NN1, i.e. the accuracy of the defect masks predicted by it. Advantageously in this embodiment, the first neural network NN1 proves to be sufficient to process the different input images (the integrated image $I_{INT}$, and the maximum image $I_{MAX}$ and/or the visible image $I_{VIS}$).

In a preferred embodiment, as can be seen in FIG. 3, based on these input data, the first neural network NN1 produces the output mask Mi directly as output.

A set of neural networks NN2 (also more simply known as 'NN2') constituting a second embodiment is schematically represented in FIG. 4.

NN2 is a set of neural networks comprising as input, according to the embodiments, of one to three convolutional neural networks of self-encoding type: $AE_{INT}$, $AE_{MAX}$, $AE_{VIS}$, and as output, a neural network $AE_{OUT}$, also of self-encoding type. The network $AI_{INT}$ constitutes the first neural network within the meaning of this disclosure; the optional networks $AE_{MAX}$, $AE_{VIS}$ form a first and a second additional network. This architecture comprising an output self-encoder $AE_{OUT}$ downstream of one or more input self-encoders makes it possible to improve the predictive accuracy of the neural network.

When the network NN2 is able to process as input not only one image, but two images or more, its performance is improved by comparison with an architecture in which the network NN2 can only take into account a single image as input.

To take into account two images or more as input, in an embodiment the neural network NN2 includes as input only a first neural network, preferably the neural network $AE_{INT}$ (and therefore does not include the networks $AE_{MAX}$ and $AE_{VIS}$); the output neural network $AE_{OUT}$ receives as input the output of this first neural network (for example $AE_{INT}$), and produces directly as output the defect mask Mi.

In other embodiments, as can be seen in FIG. 4, the neural network NN2 includes at least two neural networks as input (in the case represented, it includes the three networks $AE_{INT}$, $AE_{MAX}$, $AE_{VIS}$) and as output, the neural network $AE_{OUT}$. The input of the input neural networks comprises the different images received as input.

The output of the different input neural networks is transferred to the output neural network $AE_{OUT}$, to produce the output mask Mi.

Preferably, the defect mask Mi is directly produced by the output neural network $AE_{OUT}$.

In this case (FIG. 5), at each iteration (of index i), NN2 receives three images: an integrated image $I_{INT\ i}$, a maximum image $I_{MAX\ i}$, and an image captured in the visible spectrum $I_{VIS\ i}$.

Each of the neural networks $AE_{INT}$, $AE_{MAX}$, $AE_{VIS}$ and $AE_{OUT}$ has the same or roughly the same architecture as the neural network NN1 represented in FIG. 3. However, in the networks $AE_{INT}$, $AE_{MAX}$, $AE_{VIS}$, the presence of one (or more) normalization layers downstream of the network is optional.

To merge the data produced by the three input networks $AE_{INT}$, $AE_{MAX}$ and $AE_{VIS}$, the set NN2 includes a layer of neural networks G serving to concatenate the images $I_{INT\_OUT\ i}$, $I_{MAX\_OUT\ i}$, $I_{VIS\_OUT\ i}$, respectively produced as output by the decoders of these different networks.

Finally, in the set of neural networks NN2, the output neural network $AE_{OUT}$ further includes as output a normalization layer F. This normalization layer can be arranged in the same way as the normalization layer F described in relation to FIG. 3, with for example several layers Softmax disposed in parallel, in such a way as to produce as output different images, each representing the probabilities of defects being present at each point (or at each pixel); each image representing the defect probabilities for one of the defects searched for.

Thus in this embodiment, these different images constitute an output mask Mi, which is directly produced by the output neural network $AE_{OUT}$.

Manufacturing of a Part

The manufacturing of a part is done by iteratively carrying out, for each layer of the part, the different steps indicated by FIG. 8.

During an iteration of index i, the manufacturing of a layer n°i of the part is done by executing the following operations:

In a first step A, a new layer of powder is deposited using the scraper 170. For this purpose, the powder reserve plate is raised, while the manufacturing plate conversely descends from a corresponding height.

Next (step B1), a laser scan is performed in such a way as to scan all the points of the layer under consideration which must be part of the part to be manufactured 120. The laser scan produces a local fusion of the powder which, in the areas exposed to the laser scan, welds the grains of powder to the lower part of the part, already formed.

In parallel, the data-processing unit executes a program in such a way as to carry out a method for detecting defects B2.

This method B2, which serves to detect defects occurring during manufacturing operations in the system 1000, includes the following steps:

B21) different sequences or series of images of the surface scanned by the laser beam are captured in parallel. More precisely, for the duration of the laser scan B1, each of the cameras of the capturing device 180 captures a sequence of images. In the mode of implementation described, a first camera operating in the visible spectrum captures a sequence of images in the visible spectrum, and a second camera operating in the infrared spectrum captures a sequence of images in the infrared spectrum. Each of the images represents the entire surface scanned by the laser beam 142 (Alternatively, the capturing could be limited to an area surrounding the impact point 144 of the laser beam).

The images captured in infrared are from an optical tomography sensor. In this case it is an infrared S-CMOS sensor of a resolution that can be of 2000 pixels by 2000 pixels. The images produced by the sensor, captured in near infrared, represent the temperature field at the surface of the layer.

The captured images are successive captures, done throughout the laser scan of the layer.

B22) a preliminary treatment is applied to the sequences of captured images, using the data-processing unit 200: based on the captured images, the data-processing unit 200 computes three images:

A first image $I_{INT\_i}$ which is an integrated image of the upper surface, integrated during the integrated image capturing period, during the manufacturing of the layer n°i. The capturing period of the integrated image is equal in this mode of implementation to the duration of the laser scan for the layer n°i. It could alternatively be a set duration comprising the moment of impact of the laser beam at the point under consideration.

A second image $I_{MAX\_i}$ which is an image representing the maximum luminous energy received by each of the pixels during the capturing period of the maximum values image, during the manufacturing of the layer n°i. The capturing period of the maximum values image is equal in this mode of implementation to the duration of the laser scan. It could alternatively be a set duration comprising the moment of impact of the laser beam at the point under consideration.

A third image $I_{VIS\_i}$ which is an image, captured in the visible spectrum, of the upper surface of the layer subjected to the scanning by laser beam, during the manufacturing of the layer n°i. (This image can optionally be an integrated image $I_{VIS\_INT\_i}$, computed by integration (or averaging) of images $I_{VIS\_i}$ captured in the visible spectrum during the duration of the laser scan).

This processing captures within the data-processing unit 200 the three images $I_{INT}\ i$, $I_{MAX\_i}$ and $I_{VIS\_i}$.

The images $I_{INT}\ i$ and $I_{MAX\_i}$ are illustrated by FIGS. 5 and 6 respectively.

Thus, in the first image $I_{INT\_i}$, which is the integrated image (an example is represented in FIG. 5), the value of each pixel is given by:

$$v_{int} = \int_{t0_{layer}}^{tend_{layer}} e(\tau)d\tau$$

where e is the value of the intensity of the infrared emission measured by the pixel. This image can be interpreted as a photograph, the exposure time of which is equal to the time of the laser scan of the layer.

In the second image $I_{MAX\_i}$, which is the maximum image (an example is represented in FIG. 6), the value of each pixel is given by:

$$v_{max} = \max_{t_{layer}} e(t)$$

where $t_{layer}$ is the period of laser scan of the layer.

This maximum image can be interpreted as the envelope of the intensity of the infrared emission during the laser scan of a layer. It can be noted that the lines L of overlap between adjacent parallel bands exposed to the laser scan (or 'lasing bands'), lines that appear in white in the integrated images $I_{INT\_i}$ (FIG. 5), are not very visible in the maximum image $I_{MAX\_i}$ (FIG. 6). Owing to this property, the use of the maximum image is particularly effective to limit the number of false positives. Specifically, if only the integrated image is used, the neural network tends to grant excessive importance to these overlap lines BL. The information contributed by the maximum image thus seems to help the neural network to not interpret the lines of overlap between adjacent lasing strips as defect areas, and thus makes it possible to improve the quality of the defect masks produced by the set of neural networks NN2.

B23) the three images $I_{INT\_i}$, $I_{MAX\_i}$ and $I_{VIS\_i}$ are processed using the set of neural networks NN2.

These images are supplied as input to NN2: in the iteration n°i of the algorithm, the networks $AE_{INT}$, $AE_{MAX}$, $AE_{VIS}$ respectively receive as input the integrated image $I_{INT}\_i$, the maximum image $I_{MAX}\_i$ and the visible image $I_{VIS}\_i$. Based on these, the networks $AE_{INT}$, $AE_{MAX}$, $AE_{VIS}$ respectively produce output images $I_{INT\_OUT\ i}$, $I_{MAX\_OUT\ i}$ and $I_{VIS\_OUT\ i}$.

These output images are then concatenated by the concatenation layer G, which forms a rank 3 tensor. This tensor is supplied as input to the output neural network $AE_{OUT}$.

As output, the output neural network $AE_{OUT}$ produces a defect mask Mi. In this embodiment, the set of neural networks NN2 is configured to produce as output a defect mask which is an image Mi. This image Mi is of the same dimensions as the images $I_{INT}\ i$, $I_{MAX}\ i$ and $I_{VIS}\ i$, and indicates the location of the defects in the image.

Alternatively, the data processing carried out in step B23 can be done using the neural network NN1 (configured in a way suited to the number of images to be taken into account as input), instead of the neural network NN2.

FIG. 7 represents a binary mask obtained based on the mask Mi, by applying a thresholding function to it. Each pixel can therefore only have the value 0 or 1. Thus, the pixels located at the locations of the defects are represented in white, whereas the pixels of the areas without any defects are in black. Note that the defects clearly visible in FIG. 7 also appear on the right of the integrated image, in FIG. 5.

The joint use of the three images $I_{INT}\ i$, $I_{MAX}\_i$ and $I_{VIS}\_i$ is the combination which makes it possible to obtain the best performance, using the set of neural networks NN2. However, the first set of neurons as per this disclosure (configured and consequently trained), for example the network NN1, can produce defect masks based only on an image captured in infrared, particularly on the basis of the integrated image $I_{INT}\ i$.

B24) an action is decided on for the rest of the manufacturing, based on the defect mask Mi. The action can also be decided on based on the defect mask Mi of the step in progress, and on one or more defect mask obtained in the preceding steps. According to the defect or defects, it may be decided to continue the manufacturing (and therefore to start the manufacturing of the next layer n°i+1 of the part) without modifying anything; to continue the manufacturing by modifying one or more operating parameters of the manufacturing machine 100; or else to stop the manufacturing of the part. In the second case, the modified parameters may be the speed of displacement of the point of impact of the laser beam, the power of the laser beam, the thickness of the layer of powder deposited, etc.

On the basis of the decision taken, a command is determined and transmitted to the control unit 160 for the rest of the manufacturing.

Driving of the Neural Network(s)

The training of the neural network(s) implemented is done in a manner known per se using a database of training data. This database includes input data and output data; these output data are output masks ('ground truths') that one wishes the neural network or where applicable the set of neural networks to produce, when the input data are supplied to it as input.

According to the number of images that the neural network or the set of neural networks can receive as input, the input data can be images, pairs of images, or n-tuples of images. For example, for the training of NN2, the input data are image triplets $I_{INT}\ i$, $I_{MAX}\_i$ and $I_{VIS}\_i$ computed by carrying out the step B22 of the method.

The following explanations are given in the case where the neural network or the neural network assembly is configured to receive a triplet of images as input; but it will be understood that this disclosure is of course applicable whatever the number of images received as input by the neural network or the set of neural networks.

The desired output masks ('ground truth') can be masks illustrating the different types of defect that the neural network NN has to identify, such as for example defects of hot spots (spots where the temperature reaches an excessive value), fusion lacks, and contamination of the fusion bath. These defect masks may be composed of images (where applicable, binary images) prepared by specialists in the manufacturing of the parts concerned, and representing manufacturing defects identified by these specialists based on input image triplets $I_{INT\ i}$, $I_{MAX\ i}$ and $I_{VIS\ i}$.

In an embodiment, the neural network (or the set of neural networks) is driven so that each image of the defect mask serves to evaluate the presence of a specific defect.

In the case, the training database then includes for each defect a set of input image triplets ($I_{INT\ i}$, $I_{MAX}\_i$ and $I_{VIS}\_i$), with for each triplet an associated output image (optionally binary). This output image represents, for the input image triplet to which it corresponds, the best possible estimate of a likelihood of the defect under consideration being present, for each of the pixels of the image (and therefore for each corresponding point of the layer subjected to the laser scan).

In this case, after training, the image obtained as output of the neural network (as output of the normalization layer), is a probabilistic image, which represents a probability of the defect under consideration being present, for each pixel.

In another embodiment, at least for one image of the defect mask, the neural network is trained to evaluate the presence of several defects at once. The neural network is thus trained to predict, via the output image produced, the presence or absence of several defect types, such as for example a fusion lack, a hotspot or else a contamination of the part due to the presence of an impurity in the powder layer.

In this case, the training database then includes, for the image under consideration of the defect mask, a set of input image triplets ($I_{INT}\ i$, $I_{MAX}\_i$ and $I_{VIS}\_i$), and for each triplet an associated output image. This output image is then an image in which to each pixel is assigned a specific value (or color), associated with a certain type of defect identified at the location of the pixel. For example, this output image can be composed of pixels having one of the following values: 0 (no defect), 1 (fusion lack), 2 (hot spot) or 3 (contamination of the part).

To enrich the training database, additional images may be added by so-called "augmentation" methods. These images may be produced by applying to the images initially present in a database of examples a rotation, a shift of the image, a left/right inversion, up/down inversion etc.

The cost function used can in particular be a binary cross-entropy function.

The training can be done end-to-end (end-to-end learning) in all the proposed architectures: whether it is with the simple architecture comprising only the first neural network NN1, or with the complex architecture of the set of neural networks NN2.

Moreover, the dimension of the images can be optimized. The images supplied as input to the neural networks may be computed by under-sampling. For example, the images produced by the optical tomography sensor may have a high resolution (2000 by 2000 pixels or more), but for the implementation of the method only images of lower resolution are used, for example 1000×1000 pixels.

In the case where the images supplied as input to the neural network(s) have a high resolution and to avoid such under-sampling, another practicable technique consists in dividing the input images (initially acquired in 'high resolution') into images of lower resolution, each having a resolution compatible with the processing capabilities of the neural networks used. The different sub-images are then processed by the neural network(s), in such a way as to obtain the corresponding respective output masks. These output masks, which are of the same dimension or resolution as the sub-images, are then recombined, which makes it possible to obtain an output mask of high resolution, of the same resolution as the images initially captured. For example, input images with a resolution of 2000×2000 pixels may be divided into 16 sub-images of a dimension of 500×500 pixels. To obtain the output masks of the initial images of a resolution of 2000×2000 pixels, one then assembles the output masks respectively produced based on the different sub-images.

During the training of the network, a search for the best architecture is provided in order to automatically determine different architecture parameters of the neural network, particularly the following parameters: the dimensions of the input data of the neural network (i.e. the size of the input images $I_{INT}$, $I_{MAX}$ and $I_{VIS}$); the depth of each of the networks $AE_{INT}$, $AE_{MAX}$, $AE_{VIS}$ and $AE_{OUT}$ (number of convolutional blocks); the dimension of the intermediate data or 'feature maps' (i.e. the number of neurons per layer) in the different convolutional blocks of the different neural networks; or the number of convolutional layers of the different convolutional blocks. This search can in particular be carried out using an analysis by grid (grid search).

Although this invention has been described with reference to specific exemplary embodiments, it is obvious that different modifications and changes can be made to these examples without departing from the general scope of the invention as defined by the claims. Furthermore, individual features of the different embodiments described may be combined in additional embodiments. For example, the method may be implemented by supplying as input to a set of neural networks only the image $I_{INT}$ i, or else only the images $I_{INT}$ i and $I_{MAX}$_i, instead of the three images $I_{INT}$ i, $I_{MAX}$_i and $I_{VIS}$_i. Consequently, the description and the drawings must be considered in an illustrative sense rather than a restrictive one.

The invention claimed is:

1. A method for detecting defects during laser additive manufacturing, comprising the following steps:
   B21) a first image is captured, said first image being the image, captured in an infrared spectrum, of an upper surface of a layer of powder exposed to laser scan;
   B23) said first image is processed using a first convolutional neural network of self-encoding type, in such a way as to produce a defect mask indicating a location of defects at the upper surface of said layer of powder;
   wherein during the capturing step B21, a second image of the upper surface exposed to laser radiation is also captured;
   the second image is an image of said surface, captured in the infrared spectrum, wherein for each pixel, an intensity of the pixel represents a maximum luminous energy received by the pixel during a capturing period, wherein said first convolutional neural network is configured to receive as input the first image and the second image;
   during the processing step B23, the processing carried out takes the second image into account as input, in addition to the first image; and
   during the processing step B23, the processing is carried out using a set of neural networks comprising as input, said first convolutional neural network, and as output, an output neural network, particularly of self-encoding type, configured to receive as input the output of the first convolutional neural network and to produce the defect mask based on this input.

2. The method for detecting defects as claimed in claim 1, wherein said first image is an integrated image of the upper surface, wherein for each pixel, an intensity of the pixel represents a cumulative luminous energy received by the pixel during a capturing period.

3. The method for detecting defects as claimed in claim 2, wherein the capturing period has a duration greater than 0.1 second.

4. The method for detecting defects as claimed in claim 1, wherein during the capturing step, a third image of the upper surface exposed to the laser scan is also captured;
   the third image is an image of said surface, captured in a visible spectrum; and
   during the processing step, the processing performed takes the third image into account as input, in addition to the first image.

5. The method for detecting defects as claimed in claim 4, wherein during the processing step, the processing is carried out using a set of neural networks comprising:
   as input, said first convolutional neural network, and at least one first additional neural network of self-encoding type configured to receive as input a first additional image from among said second image and said third image; and
   as output, an output neural network of self-encoding type configured to receive as input the outputs of the first neural network and of said at least one first additional neural network, and to produce as output said defect mask.

6. The method for detecting defects as claimed in claim 5, wherein the set of neural networks further comprises a second additional neural network of self-encoding type configured to receive as input a second additional image from among said second image and said third image, and which is other than the first additional image.

7. The method for detecting defects as claimed in claim 4, wherein said first convolutional neural network is configured to receive as input the first image, the second image, and the third image.

8. The method for detecting defects as claimed in claim 1, wherein the defect mask is directly produced by the first convolutional neural network.

9. The method for detecting defects as claimed in claim 1, wherein said first neural network comprises successive layers of artificial neural networks and connections linking neural layers of a positive integer first index y in order of said successive layers of artificial neural networks to upstream neural layers of said neural layers of the positive integer first index y in order of said successive layers of artificial neural networks; said upstream neural layers being of a positive integer second index n-y in order of said successive layers of artificial neural networks, a total depth of said at least one of the neural networks considered being equal to a positive integer n.

10. The method for detecting defects as claimed in claim 1, wherein the capturing step is carried out using a photographic camera or a video camera, during the manufacturing of parts by powder bed laser fusion.

11. The method for detecting defects as claimed in claim 1, wherein in the processing step, the defect mask is directly produced by a convolutional neural network.

12. The method for detecting defects as claimed in claim 1, wherein during the processing applied to said first image using said first convolutional neural network and producing the defect mask, said first image is transmitted only to an input of the first convolutional neural network.

13. A method for manufacturing parts by powder bed laser fusion, in which at least one part is manufactured by powder bed laser fusion, and during or after the manufacturing of said at least one part, defects are detected by employing the method as claimed in claim 1.

14. A data-processing device comprising at least one processor as well as a memory in which instructions are recorded which, when they are executed by said at least one processor, lead said at least one processor to execute the steps of the method as claimed in claim 1.

15. A system for manufacturing parts by powder bed laser fusion, comprising a machine for manufacturing parts by powder bed laser fusion and a data-processing device as claimed in claim 14.

16. A non-volatile non-transitory storage medium readable by computer, on which is stored a computer program comprising instructions which, when the program is executed by at least one processor, leads said at least one processor to execute the steps of the method as claimed in claim 1.

17. A method for detecting defects during laser additive manufacturing, comprising the following steps:

B21) a first image is captured, said first image being the image, captured in an infrared spectrum, of an upper surface of a layer of powder exposed to laser scan;

B23) said first image is processed using a first convolutional neural network of self-encoding type, in such a way as to produce a defect mask indicating a location of defects at the upper surface of said layer of powder; wherein during the capturing step B21, a second image of the upper surface exposed to laser radiation is also captured and a third image of the upper surface exposed to the laser scan is also captured, the third image is an image of said surface, captured in a visible spectrum;

the second image is an image of said surface, captured in the infrared spectrum, wherein for each pixel, an intensity of the pixel represents a maximum luminous energy received by the pixel during a capturing period;

during the processing step B23, the processing carried out takes the second image and the third image into account as input, in addition to the first image; and during the processing step B23, the processing is carried out using a set of neural networks comprising:

as input, said first convolutional neural network, and at least one first additional neural network of self-encoding type configured to receive as input a first additional image from among said second image and said third image; and as output, an output neural network of self-encoding type configured to receive as input the outputs of the first neural network and of said at least one first additional neural network, and to produce as output said defect mask.

18. The method for detecting defects as claimed in claim 17, wherein the set of neural networks further comprises a second additional neural network of self-encoding type configured to receive as input a second additional image from among said second image and said third image, and which is other than the first additional image.

19. The method for detecting defects as claimed in claim 17, wherein the capturing step is carried out using a photographic camera or a video camera, during the manufacturing of parts by powder bed laser fusion.

20. The method for detecting defects as claimed in claim 17, wherein in the processing step, the defect mask is directly produced by a convolutional neural network.

* * * * *